United States Patent
Rambo et al.

(10) Patent No.: US 7,477,283 B2
(45) Date of Patent: *Jan. 13, 2009

(54) INTEGRAL EYE-PATH ALIGNMENT ON TELEPHONY AND COMPUTER VIDEO DEVICES USING A PINHOLE IMAGE SENSING DEVICE

(75) Inventors: Darwin Rambo, Surrey (CA); Philip Houghton, Surrey (CA)

(73) Assignee: Broadcom Corporation, Irvine, CA (US)

(*) Notice: Subject to any disclaimer, the term of this patent is extended or adjusted under 35 U.S.C. 154(b) by 459 days.

This patent is subject to a terminal disclaimer.

(21) Appl. No.: 11/085,428

(22) Filed: Mar. 21, 2005

(65) Prior Publication Data

US 2005/0162510 A1    Jul. 28, 2005

Related U.S. Application Data

(63) Continuation of application No. 10/397,712, filed on Mar. 26, 2003, now Pat. No. 6,888,562.

(51) Int. Cl.
    *H04N 7/14* (2006.01)
(52) U.S. Cl. .................... 348/14.16; 348/14.01
(58) Field of Classification Search .......... 348/14.16, 348/14.01, 348, 14.07, 14.08, 14.09, 14.11; 382/280
    See application file for complete search history.

(56) References Cited

U.S. PATENT DOCUMENTS

| | | | |
|---|---|---|---|
| 4,400,725 A | 8/1983 | Tanigaki | |
| 5,159,445 A | 10/1992 | Gitlin et al. | |
| 5,394,198 A | 2/1995 | Janow | |
| 5,751,337 A | 5/1998 | Allen et al. | |
| 5,815,197 A | 9/1998 | Kakii | |
| 6,137,526 A * | 10/2000 | Kakii | 348/14.16 |
| 6,687,418 B1 | 2/2004 | Ludwig | |
| 6,795,106 B1 * | 9/2004 | Cooper | 348/14.08 |
| 6,882,358 B1 * | 4/2005 | Schuster et al. | 348/14.16 |
| 6,888,562 B2 | 5/2005 | Rambo et al. | |
| 2003/0210326 A1 * | 11/2003 | Runcie et al. | 348/14.16 |
| 2004/0227693 A1 | 11/2004 | Rambo et al. | |

FOREIGN PATENT DOCUMENTS

| | | |
|---|---|---|
| JP | 10070713 A | 3/1998 |
| JP | 2000059748 A | 2/2000 |
| JP | 2001231019 A | 8/2001 |

* cited by examiner

*Primary Examiner*—Stella L Woo
(74) *Attorney, Agent, or Firm*—McAndrews, Held & Malloy, Ltd.

(57) ABSTRACT

A two-way visual communication device and methods for operating such a device are disclosed. An embodiment of the disclosed invention may comprise a visual display device and one or more pinhole imaging devices positioned within the active display area of the visual display. An image processor may be used to analyze the displayed image, and to select the output signal from one of the pinhole imaging devices. The image processor may also modify the displayed image in order to optimize the degree of eye contact as perceived by the far-end party.

17 Claims, 7 Drawing Sheets

Front View

Right Side View

Front View

Right Side View

INTEGRAL EYE-PATH ALIGNMENT ON TELEPHONY AND COMPUTER VIDEO DEVICES USING A PINHOLE IMAGE SENSING DEVICE

CROSS-REFERENCE TO RELATED APPLICATIONS/INCORPORATION BY REFERENCE

This application is a continuation of prior U.S. patent application Ser. No. 10/397,712 entitled "INTEGRAL EYE-PATH ALIGNMENT ON TELEPHONY AND COMPUTER VIDEO DEVICES USING PINHOLE IMAGE SENSING DEVICE", filed Mar. 26, 2003, now U.S. Pat. No. 6,888,562 the complete subject matter of which is hereby incorporated herein by reference, in its entirety.

FEDERALLY SPONSORED RESEARCH OR DEVELOPMENT

Not Applicable

MICROFICHE/COPYRIGHT REFERENCE

Not Applicable

BACKGROUND OF THE INVENTION

In general, interpersonal two-way visual communications devices have failed to meet the public acceptance that was expected of them following their introduction. One of the factors that may hinder usage growth is an unnatural component of the user interface of a typical two-way visual communication device. In normal face-to-face conversation, eye contact is considered to be both polite and desirable, and the avoidance of eye contact may be taken as an indication of evasiveness or deception. Because the imaging device in a typical two-way visual communication system is located outside of the viewing area of the local visual display, users making eye contact with the image of the far-end party are actually perceived by the far-end party as avoiding eye contact. The near-end party must overcome the natural tendency to look at the image of the other party, and look almost directly into their own imaging device to be perceived by the far-end party as making eye contact. To view the far-end party, however, they must look away from their own imaging device and look at the visual display showing the image of the far-end party. This forces the user to make the uncomfortable choice to either look at the displayed image of the far-end party and lose eye contact, or make eye contact by looking at the imaging device and not view the distant party. The result is an awkward interaction for those at both ends of the call.

The importance of direct eye contact in visual communication prompted the development of a solution for use by television broadcast news on-air personalities. The teleprompter was invented to permit a news announcer to focus his/her view directly into the lens of a television camera while reading news text. To allow the announcer to read the news, an optical arrangement within the teleprompter passes the image of the news announcer to a television camera, while at the same time displaying to the news announcer an image of the text to be read. The result is that the announcer can view the image of the material to be read, while seeming to keep their eyes focused on the television camera. It works satisfactorily in the broadcast studio, but is a bulky and ill suited solution for interpersonal communication use on a desktop or in connection with other personal computer type applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A device and method providing integral eye-path alignment on telephony and computer video devices using a pinhole image sensing device, substantially as shown in and/or described in connection with at least one of the figures, as set forth more completely in the claims.

These and other advantages, aspects, and novel features of the present invention, as well as details of illustrated embodiments, thereof, will be more filly understood from the following description and drawings.

DETAILED DESCRIPTION OF THE INVENTION

Figure 1:
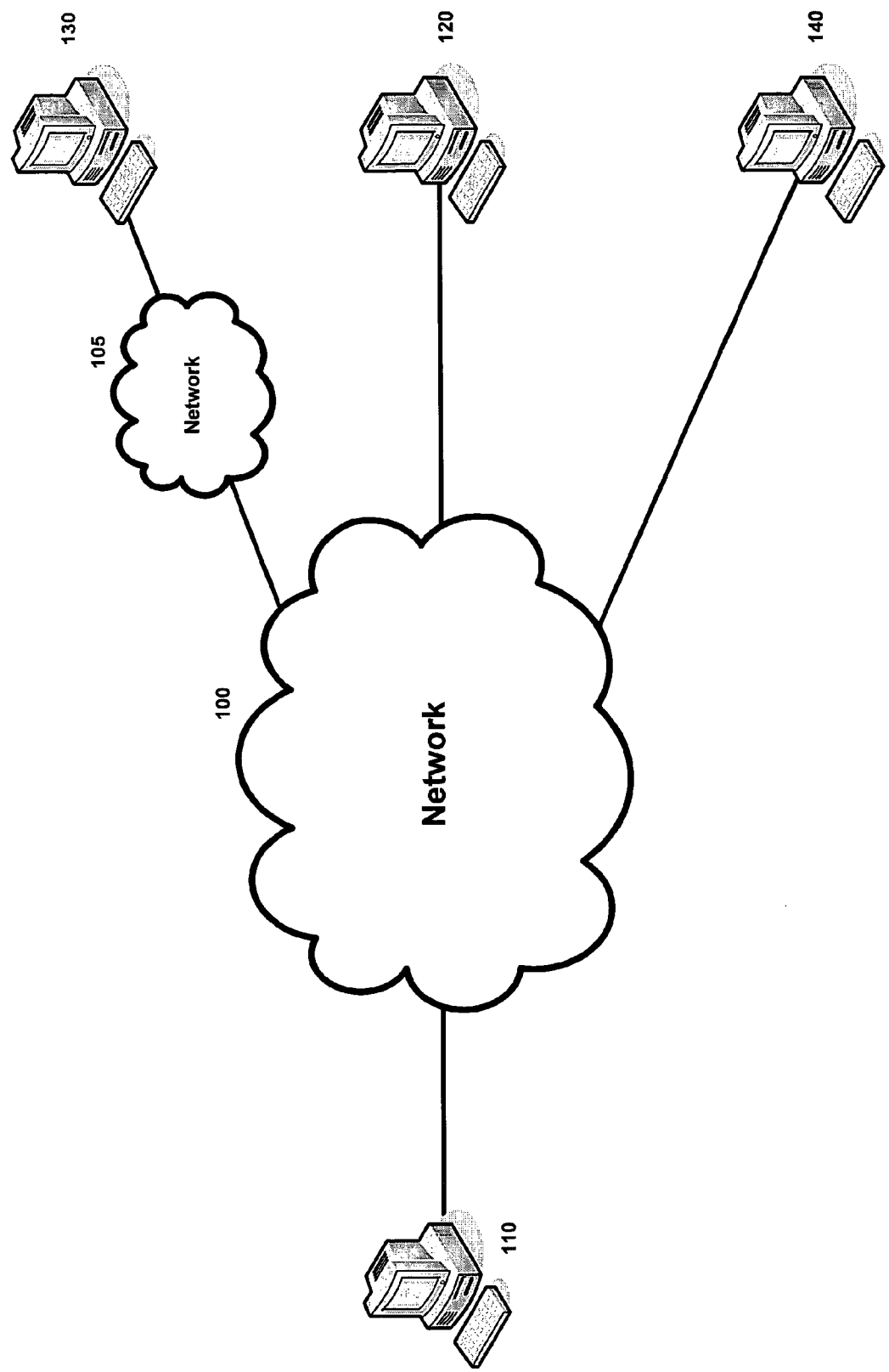
FIG. 1 shows a block diagram of an exemplary communication network in which an embodiment of the present may be practiced.

FIG. 1 is a block diagram of an exemplary communication network in which an embodiment of the present may be practiced. As illustrated in FIG. 1, communication network 100 may interconnect video telephony devices 110, 120, and 140, and is linked to video telephony device 130 through communication network 105. Each of video telephony devices 110, 120, 130, and 140 permit the two-way exchange of real-time images between two or more parties. Although the following detailed description will illustrate the operation of an embodiment of the present invention in terms of communication between two parties (referring to them as the "near-end" and "far-end" parties), restriction to two parties is for illustrative purposes only and is not a limitation of the present invention. Communication networks 100 and 105 may be, for example, wired packet networks based upon synchronous optical network (SONET), synchronous digital hierarchy (SDH), asynchronous transfer mode (ATM), 10/100/1000 megabit Ethernet, or wireless packet networks based upon, for example, the IEEE 802.11a, 802.11b, or 802.11g standards, or the Global System for Mobile Communications (GSM), IS-136 Time Division Multiple Access (TDMA), or IS-95 Code Division Multiple Access (CDMA) cellular wireless network standards. Communication networks 100 and 105 may also be based upon traditional circuit switched networks with synchronous transmission links such as, for example, time division multiplex DS0, DS1, or DS3 connections, digital subscriber lines (DSL), or asynchronous dialup facilities.

Figure 2:
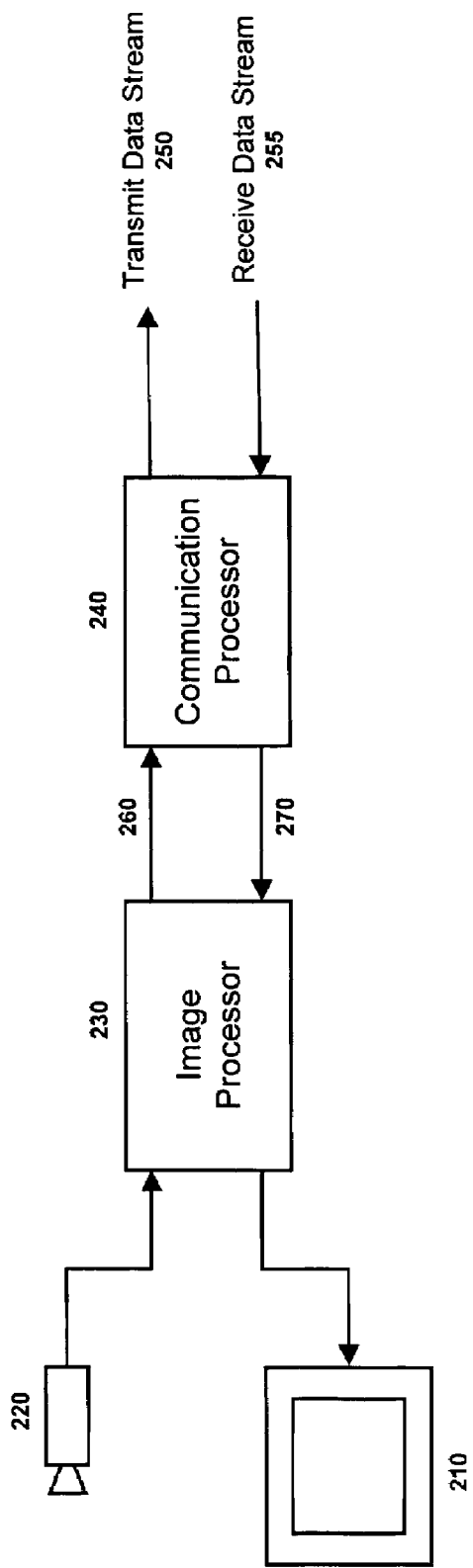
FIG. 2 is a block diagram of a video telephony device, in accordance with the present invention.

FIG. 2 shows a block diagram of a video telephony device, in accordance with the present invention. The video telephony device 200 of FIG. 2 may correspond, for example, to any of video telephony devices 110, 120, 130, and 140 of FIG. 1. As shown in FIG. 2, video telephony device 200 is comprised of visual display device 210, pinhole imaging device 220, image processor 230, and communications processor 240. In the ingress path of the video telephony device 200, the pinhole imaging device 220 transduces an image into an electrical signal that is passed to image processor 230. The image processor 230 converts the electrical signal from the pinhole imaging device 220 into the image data 260. The image data 260 from image processor 230 is converted into transmit data stream 250 by communication processor 240, which transmits it to, for example, communication network 100 or 105 of FIG. 1, for delivery to a far-end video telephony device.

In the egress path, receive data stream 255 from far-end video telephony device 200 is received from a communication network such as, for example, communication network 100 or 105 of FIG. 1. The image data 270 contained within receive data stream 255 is passed by the communication processor 240 to the image processor 230. The image processor 230 then converts the image data 270 from the representation used during transmission via receive data stream 255 to the form used by the visual display device 210. In addition, the image processor 230 may modify the image received from the far-end user before it is displayed on the visual display device 210, to further enhance the visual communication session.

Figure 3B:
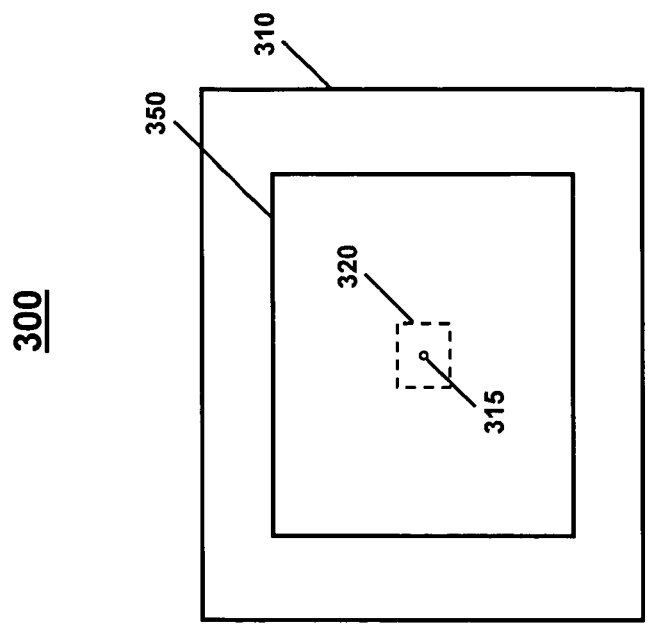
FIG. 3A and 3B show right side and front views, respectively, of the visual display device and pinhole imaging device of an exemplary two-way visual communication device, in accordance with present invention.
Figure 3A:
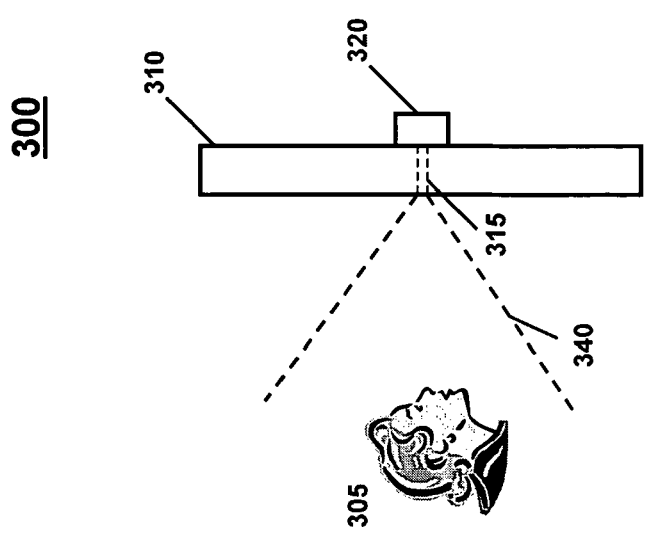

FIG. 3A and 3B show right side and front views, respectively, of the visual display device and pinhole imaging device of an exemplary two-way visual communication device 300, in accordance with present invention. The exemplary embodiment of a two-way visual display device 300, as shown in of FIG. 3A and 3B, is comprised of visual display device 310 and pinhole imaging device 320. Visual display device 310 may correspond to visual display device 210 of FIG. 2, and may be, for example, a liquid crystal display (LCD), a plasma display, or a light emitting diode display. The pinhole imaging device 320 may correspond to pinhole imaging device 220 of FIG. 2. In the embodiment of FIG. 3A and 3B, visual display device 310 has been adapted to incorporate a transparent window 315. As shown in the illustration, the aperture of pinhole imaging device 320 is positioned in alignment with the transparent window 315 in visual display device 310, allowing the image of the user viewing visual display device 310 to be received by pinhole imaging device 320. In the exemplary embodiment show in FIG. 3A and 3B, pinhole imaging device 320 has a small aperture, to minimize the size of transparent window 315. The optical distortions that may be present in the output of pinhole imaging device 320 may be minimized using an image processor such as, for example, image processor 230 of FIG. 2. Pinhole imaging device 320 may be, for example, a pinhole charge coupled device (CCD) video camera from Sony, Inc.

The active area 350 of the visual display device 310 shown in FIG. 3B is the area of the visual display device 310 on which features of an image may be displayed. Prior to engaging in two-way visual communication, the user of the two-way visual communication device 300 may adjust the position of the pinhole imaging device 320 so that their facial image is centered within the field of view 340 of the pinhole imaging device 320. This may be facilitated by displaying the image received by the pinhole imaging device 320 of the near-end two-way visual communication device 300 on the visual display device 310 of the near-end two-way visual communication device 300. This permits the user of the two-way visual communication device 300 to view their own image while making any adjustments in the field of view 340 of the pinhole imaging device 320. The display of the image received by the pinhole imaging device 320 to the associated visual display device 310 may involve a modification of the image in which the "left" and "right" sides of the image are reversed by an image processor such as, for example, the image processor 230 of FIG. 2.

By positioning the pinhole imaging device 320 within the active area 350 of the visual display device 310 of FIG. 3B, an embodiment in accordance with the present invention may position the viewpoint of the pinhole imaging device 320 in close proximity to those image features of greatest interest. This increases the degree of eye contact perceived by the far-end user, and increases the comfort of the far-end user in using the two-way visual communication device 300. An embodiment in accordance with the present invention may also use an image processor such as, for example, the image processor 230 of FIG. 2 to modify the image to be displayed on the visual display device 310 of the near-end user. This modification may place a particular facial feature, e.g. the eye of the far-end user, in close proximity to the aperture of pinhole imaging device 320. This takes advantage of the near-end user's natural tendency to look at the eyes of the displayed image, further enhancing the level of eye contact perceived by the far-end user. In addition, by positioning a dark feature of the displayed image over the aperture of pinhole imaging device 320, e.g. the pupil of an eye, may act to minimize the visibility of the aperture within the active area of visual display device 310.

Figure 4:
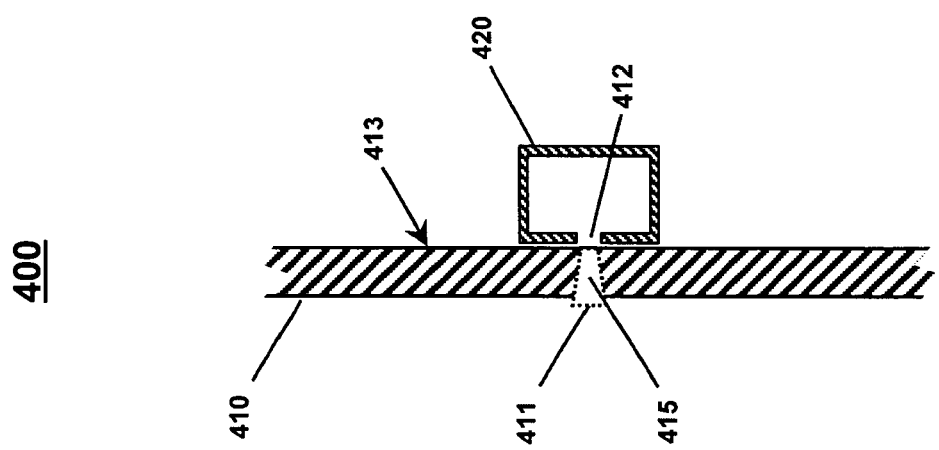
FIG. 4 shows an enlargement of the pinhole imaging device and the visual display device of FIG. 3, in an embodiment in accordance with the present invention.

FIG. 4 shows an enlargement of a portion of the pinhole imaging device and the visual display device of FIG. 3, in an embodiment in accordance with the present invention. In the illustration of FIG. 4, the pinhole imaging device 420 is positioned on the rear surface 413 of the visual display device 410. The aperture 412 of the pinhole imaging device 420 is aligned with the transparent window 415 in the visual display device 410 such that the field of view of the pinhole imaging device 420 is directed at the user viewing the visual display device 410. The visual display device 410 may use optical components such as, for example, a partially reflecting filter 411, to minimize the visibility of the transparent window 415. In another embodiment, the components of a further miniaturized pinhole imaging device 420 may be disposed within the functional elements on the viewing side of the visual display device 410, eliminating the transparent window 415.

Figure 5B:
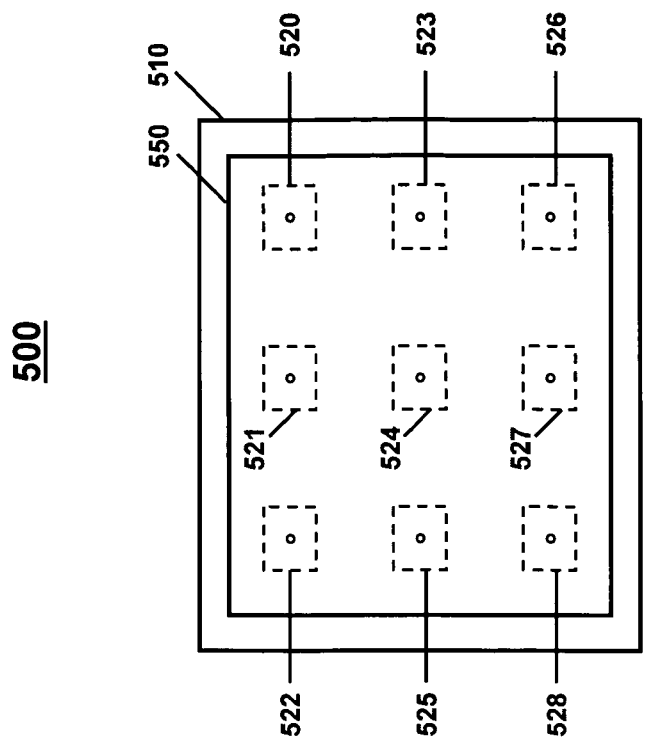
FIG. 5A and FIG. 5B show right side and front views, respectively, of an exemplary two-way visual communication device using multiple pinhole imaging devices, in accordance with the present invention.
Figure 5A:
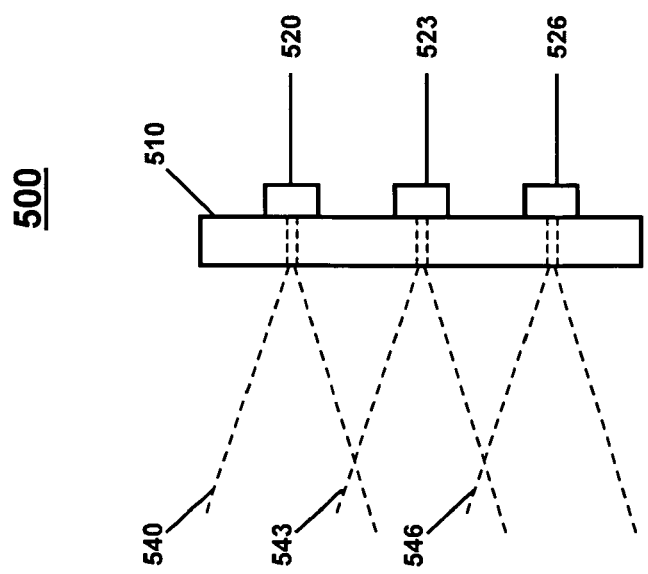

FIG. 5A and FIG. 5B show right side and front views, respectively, of an exemplary two-way visual communication device 500 using multiple pinhole imaging devices, in accordance with the present invention. In the exemplary embodiment of FIG. 5A and 5B, the two-way visual display device 500 comprises the visual display device 510 and nine pinhole imaging devices 520-528, distributed in a matrix within the active viewing area 550 of the visual display device 510. The visual display device 510 may correspond to, for example, the visual display device 210 of FIG. 2, or 310 of FIG. 3A, while each of the pinhole imaging devices 520-528 may correspond to the pinhole imaging device 220 of FIG. 2, or 320 of FIG. 3A. Although nine pinhole imaging devices 520-528 are shown in the exemplary embodiment of FIG. 5A and 5B, a larger or smaller number of pinhole imaging devices may be employed without departing from the spirit of the present invention. In the two-way visual communication device 500 of FIG. 5A and 5B, each of the pinhole imaging devices 520-528 has a field of view, such as the field of view 340 of FIG. 3A, shown in FIG. 5A as fields of view 540, 543, and 546. Although shown in FIG. 5A as having a direction perpendicular to the surface of the visual display device 510, the direction of the field of view of each imaging device 520-528 may be adapted to allow the desired imaging of the user viewing the visual display device 510.

Figure 6:
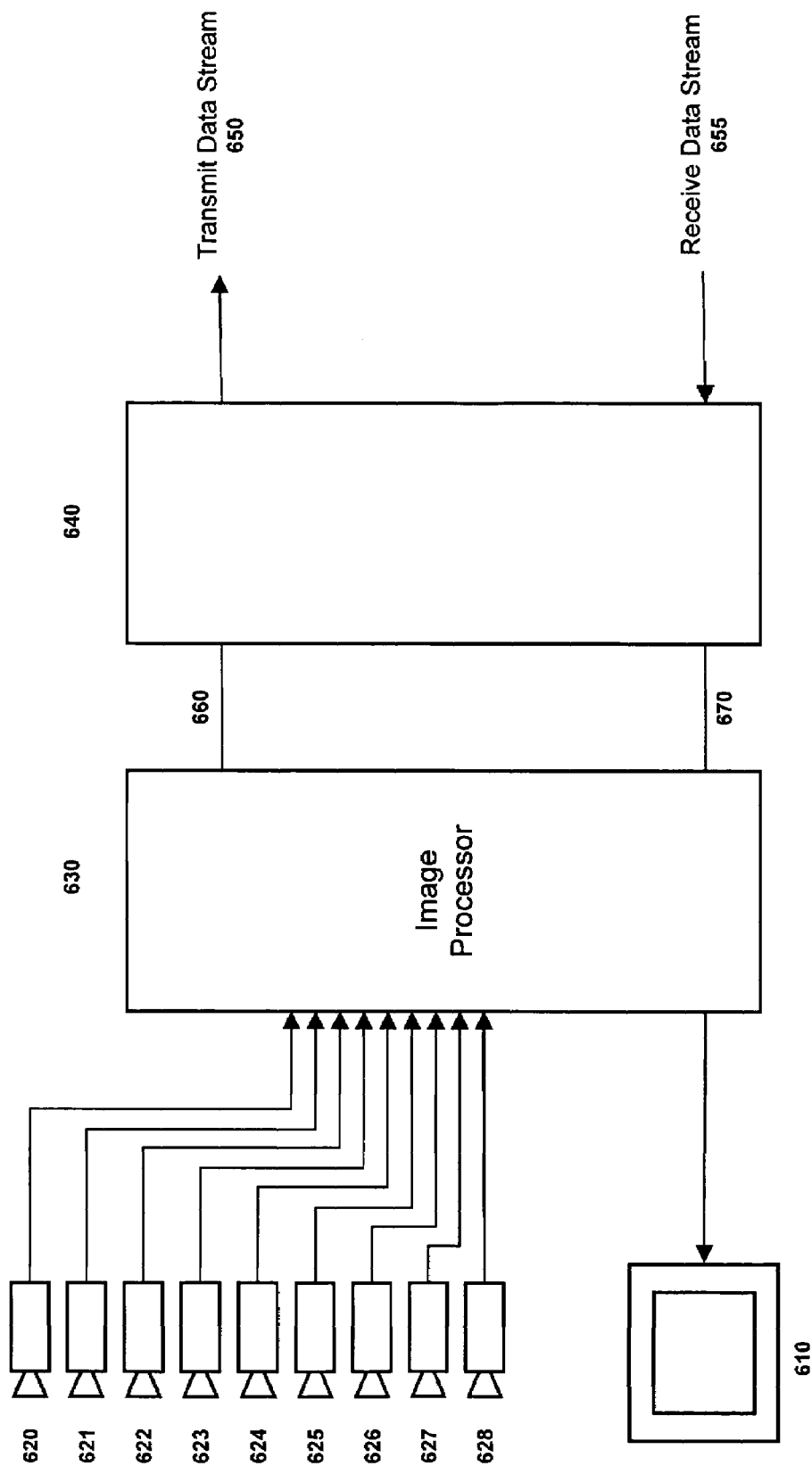
FIG. 6 is a block diagram of the exemplary two-way visual communication device shown in FIG. 5, in accordance with the present invention.

FIG. 6 is a block diagram of the exemplary two-way visual communication device shown in FIG. 5, in accordance with the present invention. The two-way visual communication device 600 of FIG. 6 is comprised of a visual display device 610, nine pinhole imaging devices 620-628, an image processor 630, and a communication processor 640. The visual display device 610 and the pinhole imaging devices 620-628 may correspond, for example, to the visual display device 510 and the pinhole imaging devices 520-528, respectively, as shown in FIG. 5. The image processor 630 may correspond to the image processor 230 of FIG. 2. As illustrated in FIG. 5, the nine pinhole imaging devices 520-528 provide images of the user from nine viewpoints within the active area 550 of the visual display device 510. The image processor 630 receives the image data 670 that originates from the two-way visual communication device 600 of the far-end party, and converts the image data 670 to a form for display on the visual display device 610. The image processor 630 may also function to select for transmission to the far-end party the image generated by one of the nine pinhole imaging devices 620-628. In one embodiment in accordance with the present invention, the image processor 630 may select the output of one of the pinhole imaging devices 620-628 based upon an analysis of the image data received from the far-end party. By determining the location within the active area 540 of FIG. 5 of a particular image feature, for example, the eyes of the far-end party, the image processor 630 can identify and select the output of the one of the nine pinhole imaging devices 620-628 closest to the particular image feature. This approach may minimize the error in position of the visual focus of the eyes of the near-end party and the position of the one selected pinhole imaging device from the nine pinhole imaging devices 620-628 that acts as the source of the image transmitted to the far-end party. Reducing the positional error results in a greater degree of eye contact as perceived by the far-end party.

In yet another embodiment in accordance with the present invention, the two-way visual communication device 600 of the far-end participant may embed information within receive data stream 655 identifying the approximate location of the speaker within the field of view of the far-end two way visual communication device 600. The image processor 630 of the near-end two-way visual communication device 600 may then use that information to select the one pinhole imaging device of the nine pinhole imaging devices 620-628 that is nearest the location identified by the far-end two-way visual communication device 600.

Figure 7:
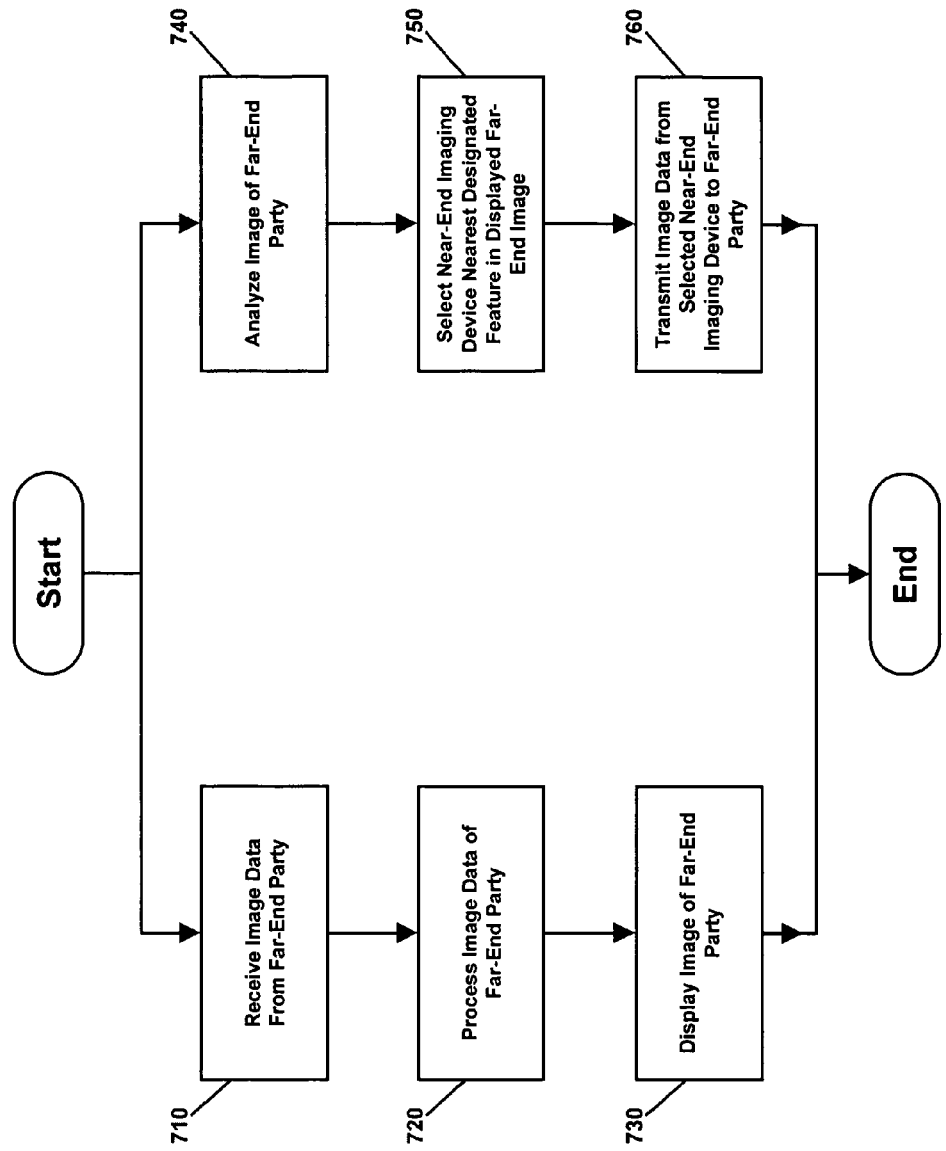
FIG. 7 is a flow diagram of a method of operating a two-way visual communication device, in accordance with the present invention.

FIG. 7 is a flow diagram of a method of operating a two-way visual communication device, in accordance with the present invention. The illustration of FIG. 7 shows two branches representing ingress and egress processes that may occur in parallel. In the egress path, image data is received (block 710) far-end two-way visual communication device, and the image data is processed into a form ready for display (block 720). The image is then displayed (730) for viewing. In the ingress path, the image to be displayed is analyzed (740), and the imaging device nearest the display location as identified by the analysis is selected (block 750). The image from the selected imaging device is then transmitted to the far-end two-way communication device (block 760).

Aspects of the present invention may be observed in a two-way visual communication device comprising a visual display device for displaying an image represented by a first signal, and at least one imaging device disposed within the active area of the visual display device. The at least one imaging device may be arranged so that the field of view of the at least one imaging device is directed at a user viewing the visual display device, and the at least one imaging device may produce a second signal. An embodiment in accordance with the present invention may also comprise an image processor for processing at least one of the first signal and the second signal.

The imaging device in an embodiment of the present invention may be disposed behind the image plane of the visual display device, and the aperture of the at least one imaging device may be aligned with a transparent window within the active area of the visual display device. In addition, the optical characteristics of the visual display device in the viewing area proximate the transparent window may be adapted to minimize the visibility of the opening.

In an alternate embodiment of the present invention, the at least one imaging device may be disposed at approximately the image plane of the visual display device, where the visual display device may be a liquid crystal display, a plasma display, or a light emitting diode display. The aperture of the at least one imaging device may be disposed proximate the center of the active area of the visual display device, and an image displayed on the visual display device may be modified in order to align a feature of the image proximate the aperture of the at least one imaging device.

Another aspect of the present invention may be seen in a two-way visual communication device comprising a visual display device for displaying an image represented by a first signal, and a plurality of imaging devices. The plurality of imaging devices may be arranged in spaced relation to one another within the active area of the visual display device, and the field of view of each of the plurality of imaging devices may be directed at a user viewing the visual display device. Each of the plurality of imaging devices may produce an output signal, and the output signals may collectively form a plurality of output signals. Another embodiment of the present invention may comprise an image processor for processing at least one of the first signal and the plurality of output signals, where the processing may comprise selecting one of the plurality of output signals based upon the first signal. In an embodiment of the present invention, the image displayed on the visual display device may be modified to align a feature of the image proximate the aperture of one of the plurality of imaging devices.

An additional aspect of the present invention may be seen in a method of operating a two-way visual communication device, where the two-way visual communication device comprises a visual display device and at least one imaging device, and each of the at least one imaging device may have an output. The method of operating the two-way visual communication device may comprise displaying an image, selecting the output of one of the at least one imaging device, and transmitting the selected output. The selection may be based upon the image being displayed, and the displaying may comprise modifying the image in order to position a feature of the image proximate the aperture of one of the at least one imaging device.

Another aspect of the invention may include machine-readable storage, having stored thereon a computer program having a plurality of code sections executable by a machine for causing the machine to perform the foregoing.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A two-way visual communication device comprising:
at least one image processor for processing at least one of: a first signal and a second signal, the first signal representing an image for display by a visual display device; and
at least one imaging device disposed within the active area of the visual display device, the at least one imaging device being arranged so that the field of view of the at least one imaging device is directed at a user viewing the visual display device, the at least one imaging device producing the second signal, the at least one imaging device being disposed within functional elements on the viewing side of the visual display device, and wherein an image displayed on the visual display device is modified in order to align a feature of the image proximate the aperture of the at least one imaging device.

2. The two-way visual communication device of claim 1 wherein the at least one imaging device is disposed behind the image plane of the visual display device, the aperture of the at least one imaging device being aligned with a transparent window within the active area of the visual display device.

3. The two-way visual communications device of claim 2 wherein the optical characteristics of the visual display device in the viewing area proximate the transparent window have been adapted to minimize the visibility of the opening.

4. The two-way visual communication device of claim 1 wherein the visual display device is one of at least a liquid crystal display, a plasma display, and a light emitting diode display.

5. The two-way visual display device of claim 1 wherein the aperture of the at least one imaging device is disposed proximate the center of the active area of the visual display device.

6. An image processor for processing a first signal representing an image for display by a visual display device and a second signal produced by at least one imaging device disposed within the active area of the visual display device, the at least one imaging device being arranged so that the field of view of the at least one imaging device is directed at a user viewing the visual display device, the at least one imaging device being disposed within functional elements on the viewing side of the visual display device, and wherein an image displayed on the visual display device is modified in order to align a feature of the image proximate the aperture of the at least one imaging device.

7. The image processor of claim 6 wherein the at least one imaging device is disposed behind the image plane of the visual display device, the aperture of the at least one imaging device being aligned with a transparent window within the active area of the visual display device.

8. The image processor of claim 7 wherein the optical characteristics of the visual display device in the viewing area proximate the transparent window have been adapted to minimize the visibility of the opening.

9. The image processor of claim 6 wherein the visual display device is one of at least a liquid crystal display, a plasma display, and a light emitting diode display.

10. The image processor of claim 6 wherein the aperture of the at least one imaging device is disposed proximate the center of the active area of the visual display device.

11. A two-way visual communication device comprising:
at least one image processor for processing a first signal representing an image for display by a visual display device and a plurality of output signals collectively formed from output signals produced by each of a plurality of imaging devices arranged in spaced relation to one another within the active area of the visual display device, the field of view of each of the plurality of imaging devices being directed at a user viewing the visual display device; and
wherein the image displayed on the visual display device is modified to align a feature of the image proximate the aperture of one of the plurality of imaging devices.

12. The two-way visual communication device of claim 11 wherein the processing comprises selecting one of the plurality of output signals based upon the first signal.

13. A method of operating a two-way visual communication device, the two-way visual communication device comprising a plurality of imaging devices, each of the plurality of imaging devices having an output, the method comprising:
selecting the output of one of the plurality of imaging devices, the selecting based upon a displayed image, wherein the displayed image is modified in order to position a feature of the image proximate the aperture of one of the plurality of imaging devices; and
transmitting the selected output.

14. A machine-readable storage, having stored thereon a computer program having a plurality of code sections for implementing a two-way visual communication device, the code sections executable by a machine for causing the machine to perform the operations comprising:

selecting the output of one of a plurality of imaging devices, the selecting based upon a displayed image, wherein the displayed image is modified in order to position a feature of the image proximate the aperture of one of the plurality of imaging devices; and transmitting the selected output.

15. An image processor for selecting, based upon a first signal representing an image for display by a visual display device, one of a plurality of output signals collectively formed from the output signals of each of a plurality of imaging devices, wherein the plurality of imaging devices are arranged in spaced relation to one another within the active area of the visual display device, the field of view of each of the plurality of imaging devices being directed at a user viewing the visual display device; wherein the image displayed on the visual display device is modified to align a feature of the image proximate the aperture of one of the plurality of imaging devices.

16. The two-way visual communication device of claim 15 wherein the plurality of imaging devices is disposed within functional elements on the viewing side of the visual display device.

17. The two-way visual communication device of claim 15 wherein the plurality of imaging devices is disposed behind the image plane of the visual display device, the aperture of each of the plurality of imaging devices being aligned with a transparent window within the active area of the visual display device.

* * * * *